Patented Oct. 20, 1925.

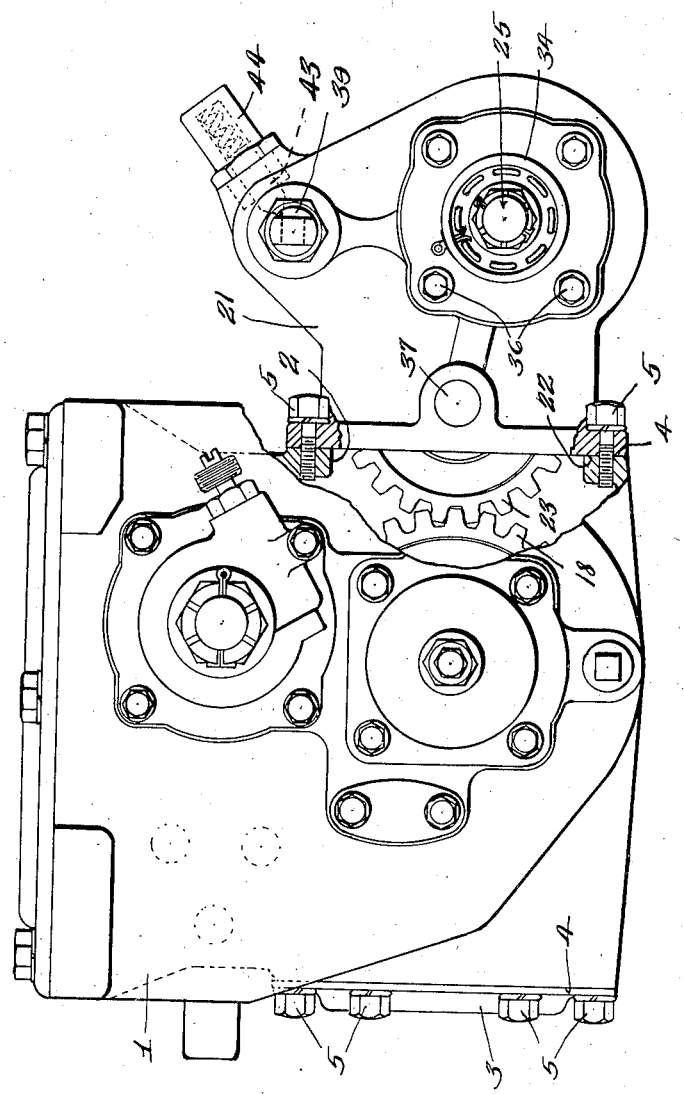

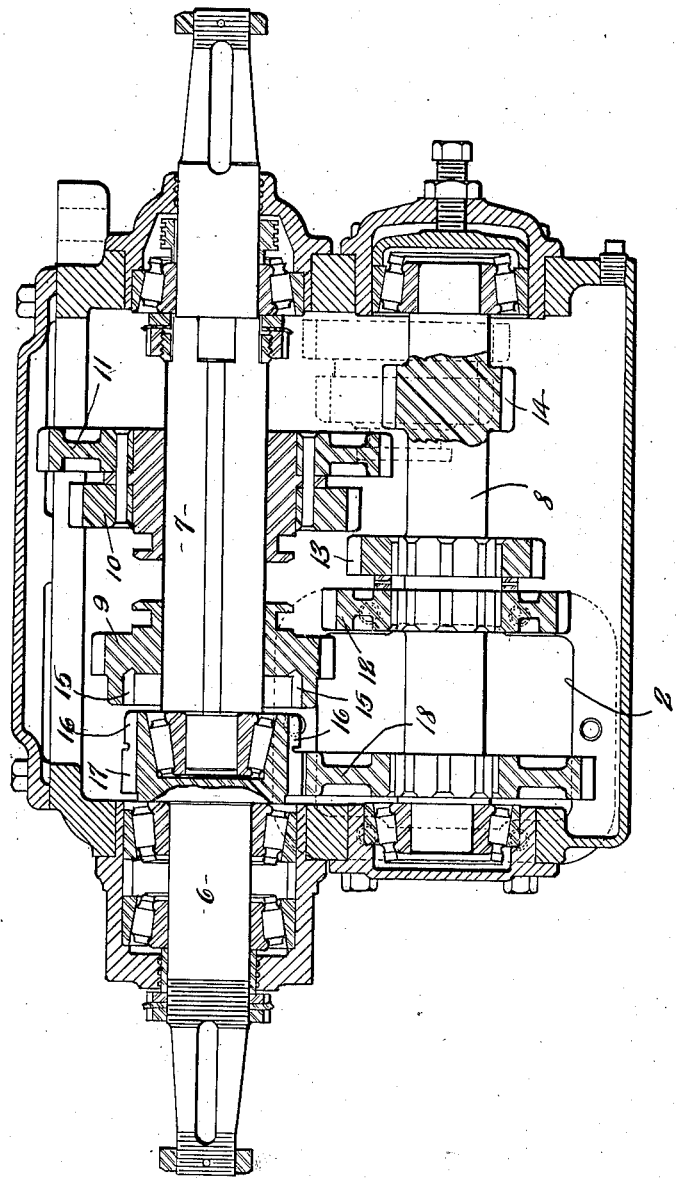

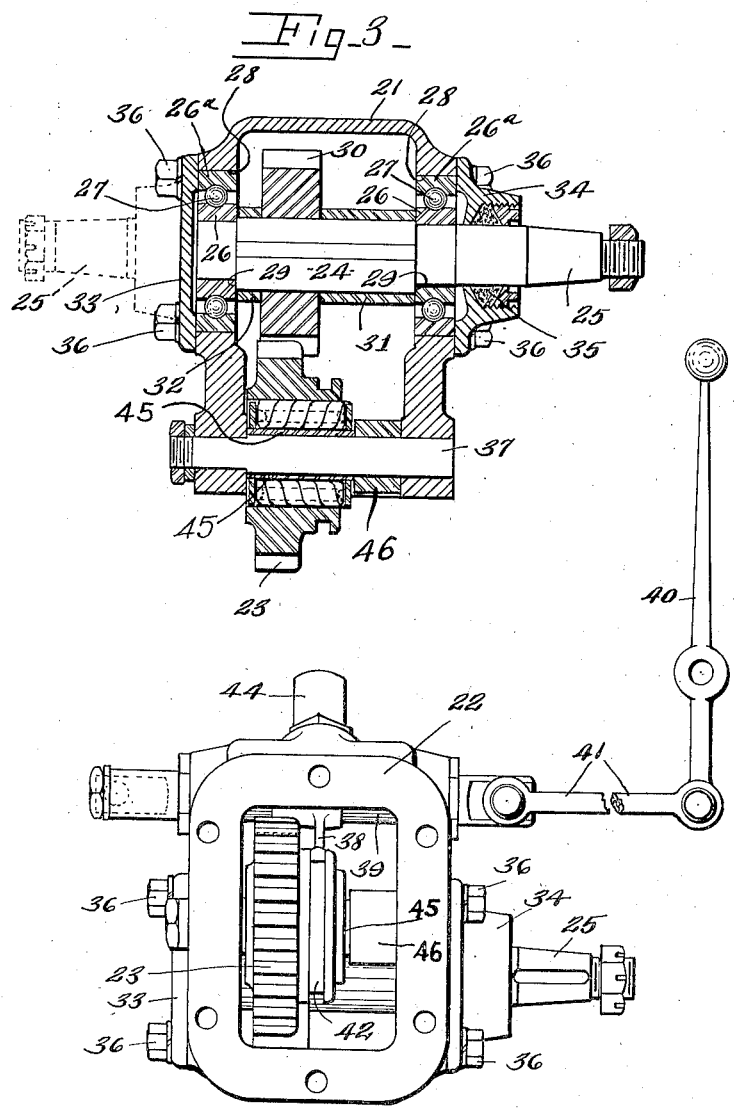

1,557,628

UNITED STATES PATENT OFFICE.

HENRY W. SWEET, OF SYRACUSE, NEW YORK, ASSIGNOR TO BROWN-LIPE GEAR COMPANY, OF SYRACUSE, NEW YORK, A CORPORATION OF NEW YORK.

POWER TAKE-OFF.

Application filed December 4, 1922. Serial No. 604,679.

*To all whom it may concern:*

Be it known that I, HENRY W. SWEET, a citizen of the United States, and a resident of Syracuse, in the county of Onondaga and State of New York, have invented a new and useful Power Take-Off, of which the following is a specification.

This invention has for its object a power take-off attachment for transmission gearings of motor vehicles, which is particularly simple and economical in construction, highly efficient and durable in use, and readily applicable to the transmission gearing so that the power can be taken off either toward the front or the rear end of the vehicle, or from the right or the left side of the transmission gear case.

The invention consists in the novel features and in the combinations and constructions hereinafter set forth and claimed.

In describing this invention, reference is had to the accompanying drawings, in which like characters designate corresponding parts in all the views.

Figure 1 is an end elevation of a transmission gearing embodying my invention.

Figure 2 is a vertical sectional view of the transmission gearing to which this power take-off is applied.

Figure 3 is a vertical sectional view through the power take-off.

Figure 4 is an elevation of the detached power take-off looking to the right in Fig. 1.

1 designates the support of the transmission gearing, the support being usually a box or case. This case is here shown as provided with openings 2 in opposite sides thereof having covers 3 for normally closing such openings, the covers being mountable upon bearing faces 4 around the openings and held in position in any suitable manner, as by cap screws 5.

As will be understood by those skilled in the art, the transmission gearing may be of any suitable form, size and construction, and usually includes driving and driven shafts 6, 7, arranged in axial alinement, a jack shaft 8 arranged in the case parallel to the shaft 6, 7 and change speed gearing between the shafts 6, 8, 7, this gearing including slidable gears 9, 10, and 11 shiftable into and out of mesh respectively with gears 12, 13 and 14, and the gear 9 also having a clutch face 15 for engaging a clutch face 16 on a gear 17 rotatable with the drive shaft 6, the clutch faces 15 and 16 connecting the driving and driven shafts 6, 7 directly together. The gear 17 on the drive shaft 6 meshes with a gear 18 fixed on the jack shaft 8 in order to drive the jack shaft, this gear 18 is arranged opposite to the openings 2 in opposite sides of the case 1.

As the transmission gearing may be of any suitable form, size and construction, and as the construction and operation is well-known, further description is thought to be unnecessary.

The power-take-off comprises a support or case 21 having a bearing face 22 complemental to the bearing faces 4 and interchangeably mountable on such bearing faces with the covers 3.

The power take-off further includes motion transmitting mechanism including a gear 23 within the power take-off case 21 and arranged to project through one or the other of the openings 2 of the main case 1 for meshing with the gear 18, the gear 23 being mounted to shift axially into and out of mesh with the gear 18. The motion transmitting mechanism further includes a shaft 24 mounted in bearings in opposite sides of the case 21 and projecting beyond one side thereof for taking off the power, this shaft having a motion transmitting member thereon connected to the gear 23, and said shaft being reversible end for end in the case and relatively to said motion transmitting member so that its power take-off end 25 may be arranged to either project forwardly or rearwardly.

In the illustrated embodiment of my invention, the shaft 24 is mounted in anti-friction bearings removably supported by the case 21, each of these bearings comprising inner and outer rings 26, 26ª and anti-friction members as balls 27 between the rings, the inner rings 26 being mounted on the shaft to rotate therewith and the outer rings being located in openings 28 in the opposite side walls of the case 21. The shaft is formed with shoulders 29 abutting or thrusting against the inner rings 26. The motion transmitting member on the shaft is here illustrated as a gear 30 mounted on the shaft 24 within the case 21, and meshing with the gear 23, the shaft being slidable endwise relatively to the gear 30 and the gear 30 being held from sliding movement on the shaft by spacing means here shown as sleeves 31, 32 interposed between opposite sides of the gear and the inner rings 26 on the bearings. The intermediate portion of the shaft 24 on which the gear 30 and the spacers 31, 32, are mounted is preferably non-circular or square.

The bearings are held in the case or the openings 28 thereof by a cover 33 and a retaining member 34, the cover 33 closing the case at one end of the shaft and the member 34 having a passage for the projecting portion of the shaft and containing suitable packing 35. The cover 33 and member 34 are interchangeable with each other and are held in position in any suitable manner as by cap screws 36. The gear 23 is mounted on a shaft 37 supported in the case 21 and is shifted axially in any suitable manner as by a fork 38 carried by a rod 39 slidable in the case and operated from the outside of the case by a suitable lever 40 which is connected to the rod by a link 41, this link being interchangeably connectable to either end of the rod 39. The fork 38 works in the annular groove 42 in the hub of the shiftable gear 23. The shifting rod 39 is held in its shifted position in any suitable manner as by a spring-pressed poppet 43 located within a detachable holder or cup 44. Preferably, a roller bearing is located between the gear 23 and the shaft 37 and the gear is shiftable axially of the roller.

The gear 23 is mounted on an antifriction or roller bearing which in turn is mounted on the shaft 37, and the rollers of said bearing roll on a sleeve 45 on the shaft 37. This sleeve abuts at one end against one side of the power take-off case 21 and at its other end against a collar 46 interposed between such other end and the wall of the power take-off case. When the gear 30 is reversed, by interchanging the sleeves 31 and 32, the collar 46 is also changed from one side of the gear 23 to the other, as from the right side, Fig. 3, to the left side when the sleeve 31 is placed on the left side of the gear 30 and the sleeve 32 on the right side. This interchange is oftentimes desirable in order to bring the gear 23 in proper position to mesh with the gear in the main transmission case, and reversing of the gear 30 or interchanging of the spacing sleeves 31, 32 is required to bring the gear 30 into position to mesh with the gear 23, when so shifted to mesh with the gear in the main case.

In operation, the power take-off case may be mounted on either side of the transmission case 1 by removing one or the other of the covers 3 and placing the case 21 with its bearing face 22 against the bearing face 4 and the case 21 secured to the main case by cap screws 5.

When the power take-off case 21 is thus secured in position the gear 23 projects into the main case 1 into position to mesh with one of the gears herein, as the gear 18.

The power take-off shaft 24 may be arranged so that its projecting or take-off end projects either forwardly or rearwardly by removing the cover 33 and member 34 and the bearings therefor, removing one of the bearings from the shaft and reversing the shaft relatively to the gear 30 and spacers 31, 321, so that the projecting end extends in the desired direction, then replacing the bearings and interchanging the cover 33 and the member 34. Also, the operating lever 39 and link 40 may be connected to either end of the shifting rod 38.

If necessary, a gasket may be interposed between the bearing faces 4 and 22 in order to bring the gears 18 and 23 into proper meshing relation.

This power take-off is particularly advantageous in that it can be readily placed in any desired location without the necessity of building several models of transmission gearing and power take-off.

What I claim is:

The combination with a transmisison gearing, comprising a main casing, of a power take-off, comprising a case interchangeably mountable upon opposite sides of the main case, and motion transmission means in the power take-off case, including a gear arranged to project into the main case, and mesh with one of the gears therein when the power take-off is mounted on either side of the main case, a reversible power take-off shaft mounted in the power take-off case, reversible to project beyond either the front or rear side thereof, gearing within the case including the former gear, such gearing including the former gear being also reversible within the power take-off case from one side of the case to the other, and reversible means for holding the gears of such gearing in either of such reversible positions in the power take-off case, whereby the power take-off is mountable interchangeably on opposite sides of the main case, and the gearing is reversible in the power take-off case from either side of the case to the other and the power take-off shaft, is reversible end for end in the power take-off case.

In testimony whereof, I have hereunto signed my name, at Syracuse, in the county of Onondaga, and State of New York, this 24th day of November 1922.

HENRY W. SWEET.